Dec. 1, 1942.  J. F. McWHORTER ET AL  2,303,567
RESILIENT SEAT MOUNTING
Filed Dec. 10, 1940

INVENTOR.
JOHN F. McWHORTER
BY MARION W. HUMPHREYS
Kwis Hudson & Kent
ATTORNEYS

Patented Dec. 1, 1942

2,303,567

UNITED STATES PATENT OFFICE 2,303,567

RESILIENT SEAT MOUNTING

John F. McWhorter, Cleveland Heights, and Marion W. Humphreys, Euclid, Ohio, assignors to The Ohio Rubber Company, Willoughby, Ohio, a corporation of Ohio Application December 10, 1940, Serial No. 369,426

4 Claims. (Cl. 155—5.20)

This invention relates to resilient seat mountings adapted for various kinds of vehicles, such as bicycles, motorcycles, and juvenile vehicles of various kinds, and for other apparatus wherein a seat of the general form of a bicycle seat is employed.

The principal object of the present invention is to eliminate the metal springs generally employed and to provide between the seat and the seat post or other part which supports the seat a cushioning unit employing rubber as the resilient cushioning medium with the rubber applied and acting in a manner such that it will yieldingly support the weight of the occupant of the seat and absorb shocks in a novel and efficient manner.

The invention may be further briefly summarized as consisting in certain novel details of construction and combinations and arrangements of parts which will be described in the specification and set forth in the appended claims.

In the accompanying sheet of drawings wherein we have shown one embodiment of our invention applied to a bicycle seat, Fig. 1 is a side view of the seat assembly;

Figure 1:
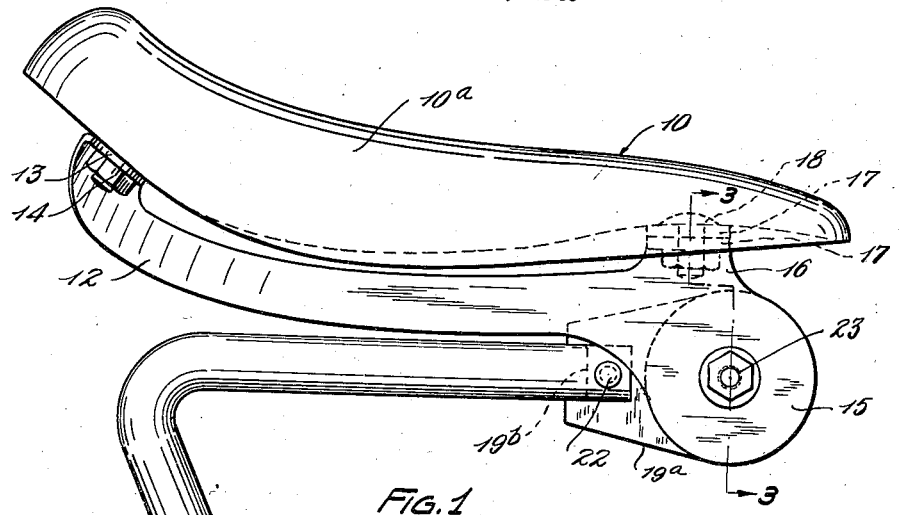

Referring now to the drawing, 10 represents the seat proper which may be made and upholstered in any of the usual ways but generally is provided with a leather top 10a, a metal bottom 10b, and suitable upholstering material therebetween. In this instance, the seat 10 is supported by a seat post 11 bent so as to provide angularly disposed portions including an upper horizontal portion and a lower inclined portion which is adapted to be received and adjustably held in the socketed post-receiving part of the frame of the bicycle or other part to which the seat and post are applied. It will be understood, of course, that it is customary that the post and the seat may be raised and lowered and securely clamped in the desired position, but the means for accomplishing this constitutes no part of the present invention and needs no further description.

Between the seat and the post we provide a resilient rubber mounting to give resiliency and to dampen shocks or vibrations to which the seat post and the part to which it is connected may be subjected. While many of the details of our improved resilient rubber mounting, including the connecting elements between the seat and the post may be constructed otherwise than herein illustrated, the particular means or embodiment shown in the present instance has proved to be very satisfactory, and such embodiment will now be described.

It will be noted that there is attached to the bottom 10b of the seat 10 a seat bracket which is preferably formed of two metal straps 12 which extend along the lower side of the seat in endwise relation thereto. These straps which are preferably steel punchings are provided at their rear ends with laterally bent ears 13 which are secured in this instance by bolt and nut assemblies 14 to the rear portion of the metal bottom 10b of the seat 10. The points of attachment are spaced a suitable distance apart and from these points of attachment the straps 12 extend in curved lines forwardly and inwardly and at their forward ends are provided with lower circular enlargements 15 which are parallel to each other and are spaced closer together than the points of connection of the ears 13 with the rear portion of the seat. Above and slightly to the rear of the circular enlargements 15 the straps have upstanding portions 16 provided at their upper ends with inwardly extending overlapping ears 17 which are secured to the forward central part of the bottom 10b of the seat by a bolt and nut assembly 18. Thus the seat bracket consisting of the two straps 12 is secured to the bottom of the seat at three points, two at the rear which are spaced apart where the seat is widest and one at the front on the center plane of the seat. It should be noted that the circular enlargements 15 are not only in parallel relation but are vertical or in planes at right angles to the plane of the seat proper.

Coming now to the resilient mounting for the seat, this mounting consists of a unit with one or more parts attached to the seat post, one or more parts attached to the seat bracket, and one or more intervening resilient media of natural or artificial rubber arranged and applied between these parts in a manner such that the weight of the occupant and the dampening of vibrations transmitted between the post and the seat are resisted and absorbed or dampened by torsional or shear stresses set up in the rubber.

Figures 3, 4:
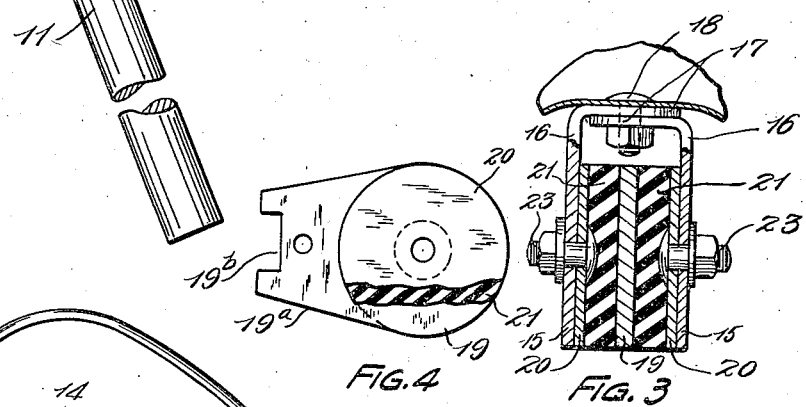
Fig. 3 is a fragmentary transverse sectional view along the irregular line 3—3 of Fig. 1.
Fig. 4 is a side view of the resilient element of the mounting with portions broken away.
Figure 2:
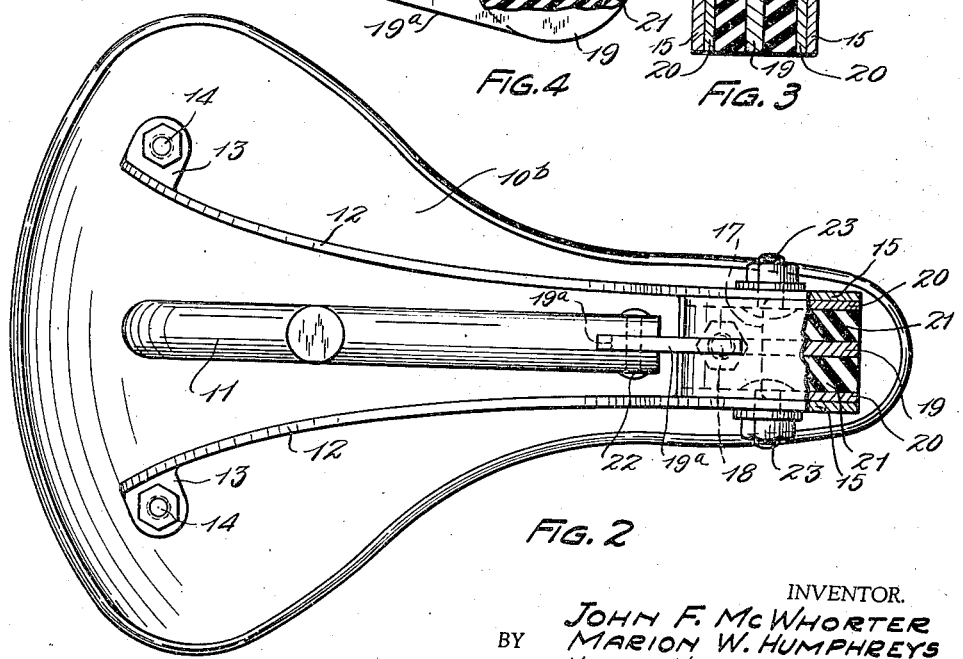
Fig. 2 is a bottom view of the same with portions broken away.

In the present embodiment of the invention this unit consists of three metal parts, preferably steel punchings, two arranged at the sides of the unit and one at the center with rubber therebetween, all of which parts lie in planes at right angles to the general plane of the seat or in vertical planes when the bicycle frame or other equipment is in an upright of vertical position. The three metal parts consist of a middle disk 19 and two outer disks 20 which are spaced apart by two rubber disks 21. The middle disk 19 has a rearward extension 19a the rear end of which has a rectangular notch 19b (see particularly Fig. 4). The forward end of the horizontal portion of the seat post is bifurcated and the bifurcated portion is fitted into the notch 19b and overlaps opposite sides of the extension 19a to which it is rigidly secured by a rivet or equivalent means 22, see Figs. 1 and 2. The two outer metal disks 20 are secured to the inner sides of the circular enlargements 15 of the straps 12 by bolt and nut units 23 which extend centrally through the disks 20 and centrally through the enlargements 15 of the straps.

The rubber disks 21 not only lie between the outer disks 20 and the middle disk 19 but they are vulcanized to and strongly adhere to the faces of the disks 19 and 20 which they engage. It will be noted particularly by reference to Fig. 3 that the heads of the bolt and nut units 23 are on the inner side of the disks 20 and are embedded in the rubber while the nuts are on the outer sides of the circular enlargements 15 of the straps and are preferably separated from the outer surfaces of the circular enlargements by washers. The strong adherence between the rubber disks 21 and the engaging disks 19 and 20 is obtained either by the use of rubber cement which is applied to the rubber or to the metal disks prior to vulcanization or by brass-plating the metal disks.

The normal position of the seat 10 with reference to the seat post can readily be varied by loosening the nuts of the nut and bolt assemblies 23, then swinging the seat up or down with a pivotal movement about the axis of the bolt and nut assemblies 23, and tightening the nuts.

The two disks of rubber of the cushioning unit allow relative angular movement between the outer disks 20 which are attached to the seat and the inner or middle disk 19 which is attached to the seat post. Normally, i. e., when the vehicle or apparatus is not in use, the disks of rubber are substantially free of stresses of all kinds, including compression, tensile, and shear stresses, but when the rider mounts the seat, his weight will cause the seat to swing downwardly about the axis of the bolt and nut assemblies 23, placing the rubber disks under shear or torsional load, and the weight of the occupant of the seat is resisted by the shear or torsional stresses set up in the rubber. Additionally, the shocks to which the wheels of the vehicle are subjected are not to any great extent transmitted to the seat and to the occupant but are dampened or absorbed by the relative rotary movement between the metal disks of the resilient shock absorbing unit, the rubber between the disks yieldingly resisting this movement as the shear or torsional stresses to which the rubber is subjected are increased or decreased as the relative movement between the disks takes place first in one direction and then in the other.

The strength of the rubber and the strong adherence between the rubber and the middle and outer metal disks to which the rubber is attached are such that the rubber very effectively resists the torsional stresses to which it is subjected by the weight of the seated occupant and by the shocks and vibrations transmitted to the seat post, with the result that a resilient mounting is provided between the post and the seat which is small, compact, not unsightly, and durable, as well as efficient and satisfactory in operation.

As stated above, the resilient means consisting in this case of the disks 21 may be formed of natural or artificial rubber. Any of the artificial rubbers on the market, including artificial rubbers known by the trade-names Neoprene, Perbunam, Thiokol, and Koroseal, may be employed.

While we have shown the preferred construction, many modifications may be made not only in the resilient unit itself but in the manner of attachment thereof to the seat post and to the seat. We therefore aim in our claims to cover all modifications which do not involve a departure from the spirit and the scope of the invention.

Having thus described our invention, we claim:

1. In combination with a seat for bicycles and the like and a seat supporting post, a cushioning and supporting unit located between the forward end of the seat and the post and comprising three disks located in parallel planes and spaced apart, the middle disk being attached to the post and the outer disks being attached to the seat, and bodies of rubber between the middle disk and the two outer disks and vulcanized thereto, said bodies of rubber constituting the sole connection between the intermediate and outer disks.

2. In combination with a seat for bicycles and the like and a seat supporting post, a cushioning and supporting unit located between the forward end of the seat and the post and comprising three disks located in parallel planes and spaced apart, the middle disk being attached to the post and the outer disks being attached to the seat, and bodies of rubber between the middle disk and the two outer disks and vulcanized thereto, said bodies of rubber constituting the sole connection between the intermediate and outer disks and means for adjustably securing the seat to the two outer disks.

3. In combination with a seat for bicycles and the like and a seat supporting post, a cushioning and supporting unit located between the forward end of the seat and the post and comprising three disks located in parallel planes and spaced apart, the middle disk being attached to the post and the outer disks being attached to the seat, and bodies of rubber between the middle disk and the two outer disks and vulcanized thereto, said bodies of rubber constituting the sole connection between the intermediate and outer disks and means for adjustably securing the seat to the two outer disks, said means being located at substantially the axis of the disks.

4. In a device of the character stated, a supporting element and an element to be supported thereby, a cushioning unit between said elements including two parallel disks attached to one of said elements and an intermediate disk attached to the other of said elements, a body of rubber between each of the outer disks and said intermediate disk, said rubber bodies being vulcanized to the outer and intermediate disks, and said rubber bodies constituting the sole connection between the intermediate disk and each of the outer disks.

JOHN F. McWHORTER.
MARION W. HUMPHREYS.